(12) United States Patent
Silegren

(10) Patent No.: US 8,911,620 B2
(45) Date of Patent: Dec. 16, 2014

(54) UNIVERSAL SPIN-ON OIL FILTER ADAPTER

(75) Inventor: Vesa Samuel Silegren, Chattanooga, TN (US)

(73) Assignee: Vesa S. Silegren, Chattanooga, TN (US)

( * ) Notice: Subject to any disclaimer, the term of this patent is extended or adjusted under 35 U.S.C. 154(b) by 297 days.

(21) Appl. No.: 13/294,900

(22) Filed: Nov. 11, 2011

(65) Prior Publication Data

US 2012/0132395 A1 May 31, 2012

Related U.S. Application Data

(60) Provisional application No. 61/417,607, filed on Nov. 29, 2010.

(51) Int. Cl.
*F01M 11/03* (2006.01)
*B01D 35/18* (2006.01)

(52) U.S. Cl.
USPC ........ 210/175; 210/167.06; 210/181; 165/51; 165/916; 183/6.24; 183/104.3; 123/196 A; 123/196 AB

(58) Field of Classification Search
None
See application file for complete search history.

(56) References Cited

U.S. PATENT DOCUMENTS

| | | | | |
|---|---|---|---|---|
| 1,849,042 A * | 3/1932 | Rogers et al. | | 210/186 |
| 2,354,645 A * | 8/1944 | Bateman | | 210/130 |
| 2,691,429 A * | 10/1954 | Kovacs | | 184/6.24 |
| 2,798,695 A | 7/1957 | Arleque | | |
| 3,250,242 A * | 5/1966 | Pekarek | | 116/267 |
| 3,463,317 A * | 8/1969 | Prier | | 210/181 |
| 3,540,594 A * | 11/1970 | Sanderson | | 210/232 |
| 3,640,390 A | 2/1972 | Goy | | |
| 3,743,011 A * | 7/1973 | Frost | | 165/283 |
| 3,802,564 A * | 4/1974 | Turman | | 210/134 |
| 3,830,289 A | 8/1974 | Olson | | |
| 3,887,467 A | 6/1975 | Johnson | | |
| 3,912,631 A * | 10/1975 | Turman | | 210/136 |
| 4,014,794 A * | 3/1977 | Lewis | | 210/199 |
| 4,193,442 A * | 3/1980 | Vian | | 165/300 |
| 4,335,688 A * | 6/1982 | Diederich, Jr. | | 123/196 A |
| 4,345,644 A * | 8/1982 | Dankowski | | 165/154 |
| 4,354,946 A * | 10/1982 | Warlick et al. | | 210/774 |
| 4,360,055 A * | 11/1982 | Frost | | 165/283 |
| 4,372,848 A * | 2/1983 | Manders | | 210/90 |
| 4,406,784 A * | 9/1983 | Cochran | | 210/167.05 |
| 4,423,708 A * | 1/1984 | Sweetland | | 123/196 AB |
| 4,433,656 A * | 2/1984 | Norwood, Sr. | | 123/196 A |
| 4,452,695 A * | 6/1984 | Schmidt | | 210/167.05 |
| 4,479,468 A * | 10/1984 | Norwood, Sr. | | 123/196 S |
| 4,492,632 A * | 1/1985 | Mattson | | 210/167.05 |
| 4,524,733 A * | 6/1985 | Schmidt | | 123/196 A |
| 4,552,662 A * | 11/1985 | Webster et al. | | 210/232 |
| 4,561,494 A * | 12/1985 | Frost | | 165/76 |
| 4,580,625 A * | 4/1986 | Yamanaka et al. | | 165/167 |
| 4,585,924 A * | 4/1986 | Pakula | | 219/205 |
| 4,596,224 A * | 6/1986 | Prager | | 123/557 |
| 4,608,161 A * | 8/1986 | Niemeier | | 210/149 |

(Continued)

Primary Examiner — Robert James Popovics

(57) ABSTRACT

A spin-on adapter for a remote oil filter to provide additional cooling capability to the engine oil system includes a unitary piece main body having edges, a base attached the main body, a step between the main body and the base, a first orifice and a second orifice extending throughout the main body, the step, and the base, and plurality of cooling fins protruding from the edges of the main body. The plurality of fins are integrated to the unitary piece main body and the adapter is adapted to be secured to a vehicle engine.

6 Claims, 3 Drawing Sheets

(56) References Cited

U.S. PATENT DOCUMENTS

| | | | | |
|---|---|---|---|---|
| 4,626,344 A * | 12/1986 | Fick et al. | | 210/90 |
| 4,637,874 A * | 1/1987 | Ansteth | | 210/232 |
| 4,638,856 A * | 1/1987 | Yamanaka et al. | | 165/119 |
| 4,655,914 A * | 4/1987 | Wada | | 210/167.04 |
| 4,662,470 A * | 5/1987 | Fujisawa et al. | | 180/219 |
| 4,672,932 A * | 6/1987 | Schmidt | | 123/196 A |
| 4,700,670 A * | 10/1987 | Schade | | 123/196 A |
| 4,703,727 A * | 11/1987 | Cannon | | 123/196 S |
| 4,717,472 A | 1/1988 | Oberg | | |
| 4,733,556 A * | 3/1988 | Meitzler et al. | | 73/53.05 |
| 4,742,866 A * | 5/1988 | Yamanaka et al. | | 165/283 |
| 4,783,256 A * | 11/1988 | Cooper et al. | | 210/90 |
| 4,793,302 A * | 12/1988 | Osborne et al. | | 123/196 AB |
| 4,831,980 A * | 5/1989 | Nasu et al. | | 123/196 A |
| D307,461 S * | 4/1990 | Kim | | D23/209 |
| 5,014,775 A * | 5/1991 | Watanabe | | 165/167 |
| 5,036,911 A | 8/1991 | So | | |
| 5,044,545 A | 9/1991 | Matsuda | | |
| 5,060,716 A * | 10/1991 | Heine | | 165/47 |
| 5,078,209 A * | 1/1992 | Kerkman et al. | | 165/167 |
| 5,145,033 A * | 9/1992 | Bedi et al. | | 184/1.5 |
| 5,168,844 A * | 12/1992 | Waelput | | 123/196 A |
| 5,179,999 A * | 1/1993 | Meekins et al. | | 165/41 |
| 5,236,064 A * | 8/1993 | Wagoner | | 184/6.3 |
| 5,291,863 A * | 3/1994 | Jones | | 123/196 A |
| 5,291,969 A * | 3/1994 | Diederich, Jr. | | 184/6.22 |
| 5,298,158 A * | 3/1994 | Anderson | | 210/167.04 |
| 5,327,862 A * | 7/1994 | Bedi | | 123/196 R |
| 5,351,664 A * | 10/1994 | Rotter et al. | | 123/196 AB |
| 5,363,823 A | 11/1994 | Gittlein | | |
| 5,390,701 A * | 2/1995 | Lessley et al. | | 137/549 |
| 5,406,910 A * | 4/1995 | Wallin | | 123/41.33 |
| 5,431,138 A * | 7/1995 | Hurner | | 123/196 A |
| 5,443,138 A * | 8/1995 | Bedi et al. | | 184/1.5 |
| 5,452,695 A * | 9/1995 | Bedi | | 123/196 A |
| 5,467,746 A * | 11/1995 | Waelput et al. | | 123/196 A |
| 5,474,098 A * | 12/1995 | Grigorian et al. | | 134/169 A |
| 5,546,999 A * | 8/1996 | Parker | | 141/98 |
| 5,567,306 A * | 10/1996 | DeWachter | | 210/167.02 |
| 5,589,059 A * | 12/1996 | Semar | | 210/109 |
| 5,647,315 A * | 7/1997 | Saito | | 123/196 AB |
| 5,653,206 A * | 8/1997 | Spurgin | | 123/196 AB |
| 5,701,853 A * | 12/1997 | Takahashi | | 123/41.33 |
| 5,718,281 A | 2/1998 | Bartalone | | |
| 5,740,772 A | 4/1998 | Bluma | | |
| 5,746,170 A * | 5/1998 | Moriya | | 123/196 AB |
| 5,758,908 A * | 6/1998 | Haasch | | 285/192 |
| 5,787,977 A * | 8/1998 | Yuasa et al. | | 165/284 |
| 5,791,310 A * | 8/1998 | Grigorian et al. | | 123/196 A |
| 5,797,450 A * | 8/1998 | Kawabe et al. | | 165/167 |
| 5,809,963 A * | 9/1998 | Saito | | 123/195 C |
| 5,810,071 A | 9/1998 | Pavlin | | |
| 5,813,382 A * | 9/1998 | Grigorian et al. | | 123/196 R |
| 5,853,575 A * | 12/1998 | Wydra et al. | | 210/136 |
| 5,887,561 A * | 3/1999 | Spurgin | | 123/196 AB |
| 5,921,213 A * | 7/1999 | Grigorian et al. | | 123/196 A |
| 5,957,240 A * | 9/1999 | Apostolides | | 184/1.5 |
| 5,967,111 A * | 10/1999 | Hedman | | 123/196 A |
| 5,988,265 A * | 11/1999 | Marthaler | | 165/51 |
| 6,041,798 A * | 3/2000 | Grigorian et al. | | 134/169 A |
| 6,089,205 A * | 7/2000 | Grigorian et al. | | 123/196 A |
| 6,105,664 A | 8/2000 | Gillbrand | | |
| 6,245,232 B1 * | 6/2001 | Craft | | 210/249 |
| 6,261,448 B1 * | 7/2001 | Merchant et al. | | 210/184 |
| 6,263,960 B1 | 7/2001 | Yamanaka | | |
| 6,263,962 B1 * | 7/2001 | Komoda et al. | | 165/167 |
| 6,427,768 B2 * | 8/2002 | Komoda et al. | | 165/145 |
| 6,558,536 B2 * | 5/2003 | Jainek et al. | | 210/184 |
| 6,651,777 B2 * | 11/2003 | Suratt | | 184/1.5 |
| 6,746,600 B2 * | 6/2004 | Nguyen | | 210/167.06 |
| 6,811,686 B1 * | 11/2004 | Sorce | | 210/167.06 |
| 6,814,133 B2 * | 11/2004 | Yamaguchi | | 165/41 |
| 6,818,125 B2 * | 11/2004 | Smith | | 210/167.02 |
| 6,994,150 B1 * | 2/2006 | Kline | | 165/41 |
| 6,994,784 B2 * | 2/2006 | Jainek | | 210/149 |
| 7,055,654 B2 | 6/2006 | Gasseling | | |
| 7,108,139 B2 | 9/2006 | Nguyen | | |
| 7,134,419 B2 * | 11/2006 | LaFleur | | 123/196 R |
| 7,179,390 B1 * | 2/2007 | Layton | | 210/767 |
| 7,300,581 B2 * | 11/2007 | Seipold | | 210/232 |
| 7,445,251 B2 * | 11/2008 | Nilsen et al. | | 285/382 |
| 7,510,662 B1 * | 3/2009 | Hansen | | 210/805 |
| 7,524,416 B1 * | 4/2009 | Bergmen | | 210/232 |
| 7,644,732 B2 * | 1/2010 | Peric et al. | | 137/855 |
| 7,828,014 B2 * | 11/2010 | Peric et al. | | 137/855 |
| 7,946,430 B2 * | 5/2011 | Hawkins et al. | | 210/440 |
| 7,992,667 B2 * | 8/2011 | Rennie | | 180/219 |
| 8,038,872 B2 * | 10/2011 | Jokschas et al. | | 210/86 |
| 8,056,231 B2 * | 11/2011 | Luvisotto et al. | | 29/890.052 |
| 8,057,687 B2 * | 11/2011 | Jainek | | 210/767 |
| 8,181,745 B1 * | 5/2012 | Stanfield et al. | | 184/1.5 |
| 8,231,779 B2 * | 7/2012 | Jokschas et al. | | 210/86 |
| 2001/0010262 A1 | 8/2001 | Komoda | | |
| 2002/0125188 A1 * | 9/2002 | Hacker et al. | | 210/443 |
| 2004/0182566 A1 * | 9/2004 | Jainek | | 165/300 |
| 2004/0245179 A1 * | 12/2004 | Elsegood | | 210/695 |
| 2005/0023200 A1 * | 2/2005 | Ueshima et al. | | 210/168 |
| 2006/0081361 A1 | 4/2006 | Gabbey | | |
| 2006/0201864 A1 * | 9/2006 | Seipold | | 210/232 |
| 2007/0267339 A1 * | 11/2007 | Munn | | 210/450 |
| 2008/0035544 A1 | 2/2008 | Rennie | | |
| 2008/0078716 A1 * | 4/2008 | Farmer | | 210/433.1 |
| 2008/0128345 A1 * | 6/2008 | Sotiriades | | 210/184 |
| 2008/0314572 A1 * | 12/2008 | Hommes | | 165/166 |
| 2009/0038580 A1 * | 2/2009 | Hamilton | | 123/196 AB |
| 2009/0056650 A1 * | 3/2009 | Tawarada et al. | | 123/41.44 |
| 2010/0037849 A1 * | 2/2010 | Jainek et al. | | 123/196 A |
| 2011/0277707 A1 * | 11/2011 | Cockerill et al. | | 123/41.01 |
| 2012/0061048 A1 * | 3/2012 | Ohi et al. | | 165/51 |
| 2012/0132395 A1 * | 5/2012 | Silegren | | 165/51 |
| 2013/0167785 A1 * | 7/2013 | Palazzolo et al. | | 123/41.33 |
| 2013/0180496 A1 * | 7/2013 | Murphy | | 123/196 A |

* cited by examiner

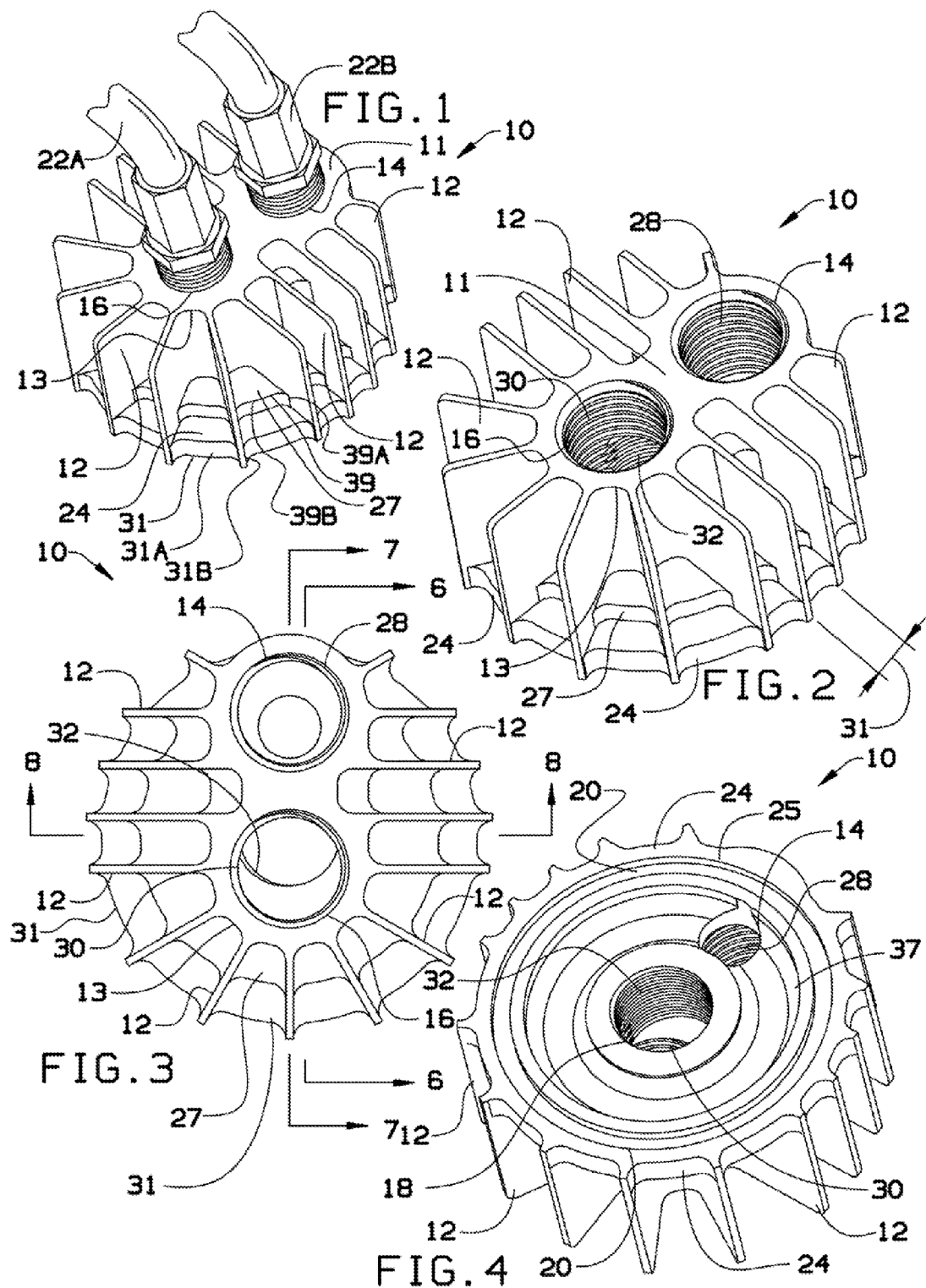

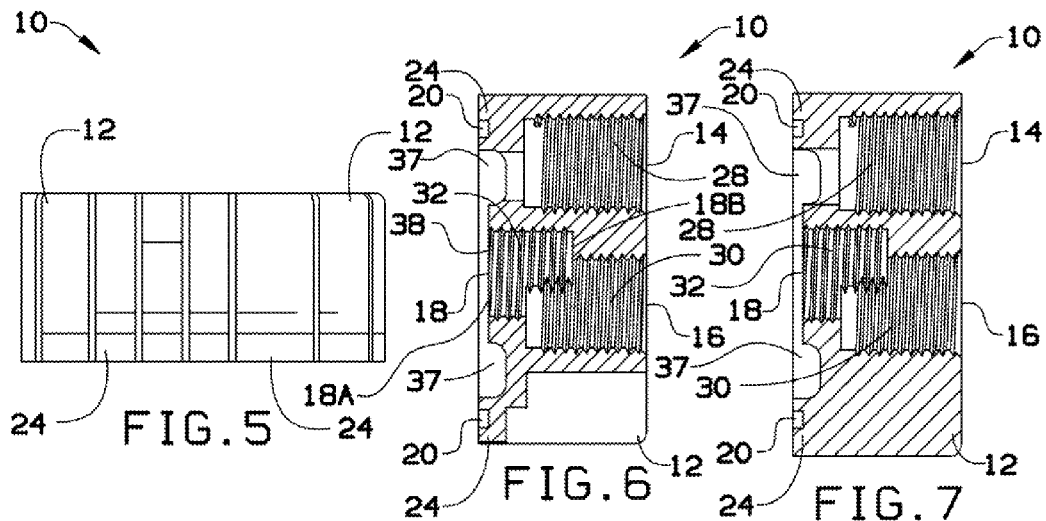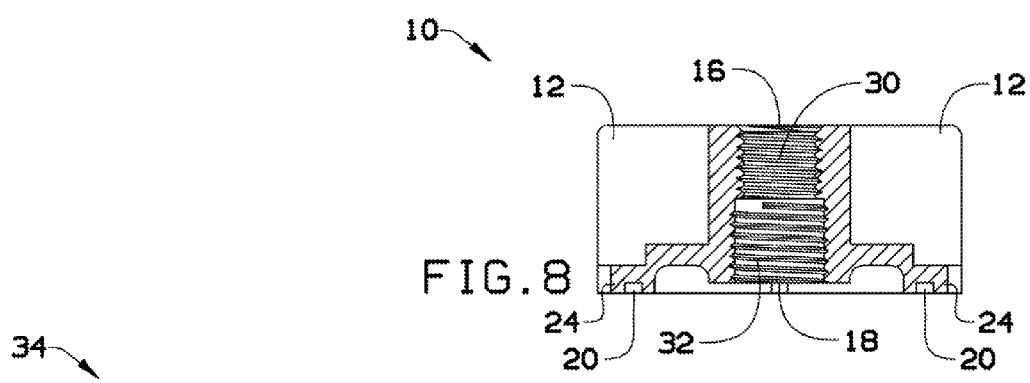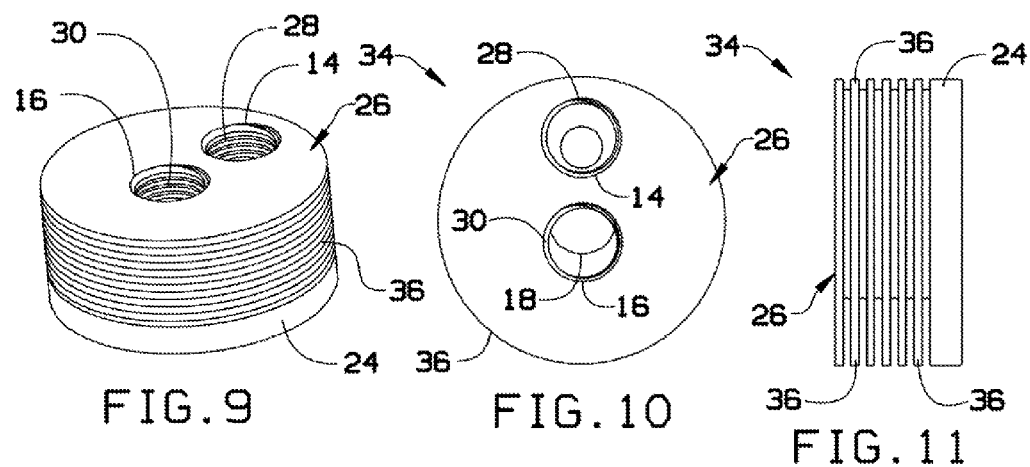

US 8,911,620 B2

UNIVERSAL SPIN-ON OIL FILTER ADAPTER

CROSS-REFERENCE TO RELATED APPLICATIONS

This application claims the benefit of priority to U.S. Provisional Application No. 61/417,607 filed Nov. 29, 2010, the contents of which are incorporated herein by reference.

BACKGROUND OF THE INVENTION

The present invention generally relates to a spin-on oil filter adapter with increased cooling capability for internal combustion engines. More particularly, the present invention relates to a spin-on oil filter adapter having integrated cooling fins.

Internal combustion engines circulate oil through the engine to reduce friction between moving parts while the engine is in operation. During the circulation process, the oil accumulates debris and heats up from the heat dissipated from the engine. Oil filters are currently used to filter the lubricated oil. Oil filters are generally placed on the engine block. In order to add engine oil cooling capability to an engine an oil cooler is generally installed and this requires an spin-on adapter to be installed on the block to facilitate the hoses to and from the cooler. This requires the oil filter to be mounted at a distance from the engine.

As can be seen, there is a need for a device that provides additional cooling capability to the engines oil system.

SUMMARY OF THE INVENTION

In one aspect of the present invention, a spin-on adapter includes a unitary piece main body having edges, a base attached to the main body, a step between the main body and the base, a first orifice and a second orifice extending throughout the main body, the step, and the base, a plurality of cooling fins protruding from the edges of the main body, the plurality of fins are integrated to the unitary piece main body, and the adapter is adapted to be secured to a vehicle engine.

In another aspect of the present invention, a spin-on adapter for a remote oil filter including a main body having edges, a base attached to the main body, a step formed between the main body and the base, a first orifice and a second orifice extending throughout the main body, the step, and the base, a plurality of cooling fins integrated to and protruding from the edges of the main body, the base and the step include a perimeter having a wavy shape including peaks and valleys, and the fins project away from the main body until reaching the peaks of the base.

These and other features, aspects and advantages of the present invention will become better understood with reference to the following drawings, description and claims.

BRIEF DESCRIPTION OF THE DRAWINGS

FIG. 1 is a perspective front view of an adapter for a remote oil filter according to an exemplary embodiment of the present invention showing the adapter connected to oil filter hoses;

FIG. 2 is a perspective front view of the adapter of FIG. 1;

FIG. 3 is a top view of the adapter of FIG. 1;

FIG. 4 is a perspective bottom view of the adapter of FIG. 1;

FIG. 5 is a side view of the adapter of FIG. 1;

FIG. 6 is a cross-section view of the adapter taken along line 6-6 in FIG. 3;

FIG. 7 is a cross-section view of the adapter taken along line 7-7 in FIG. 3;

FIG. 8 is a cross-section view of the adapter taken along line 8-8 in FIG. 3;

FIG. 9 is a perspective front view of an adapter for a remote oil filter according to another exemplary embodiment of the present invention;

FIG. 10 is a top view of the adapter of FIG. 9;

FIG. 11 is a side view of the adapter of FIG. 9; and

DETAILED DESCRIPTION OF THE INVENTION

Figure 12:
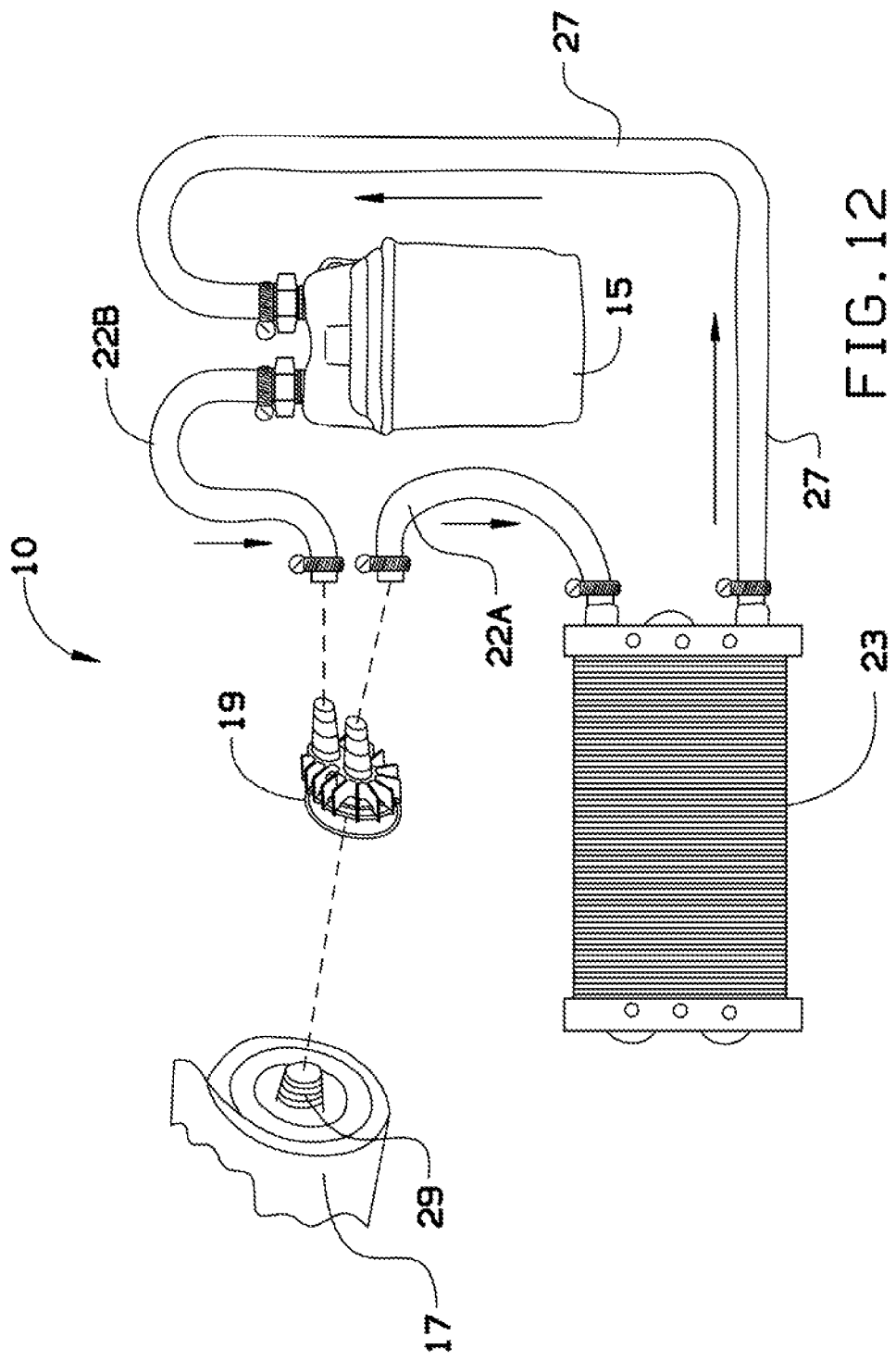
FIG. 12 is a diagram showing the adapter of FIG. 1 being used on an oil filter system for a vehicle.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a spin-on oil filter adapter to provide additional cooling capability to an engine lubrication system.

FIG. 12 shows a diagram employing an adapter 10 for a remote oil filter 15 according to an exemplary embodiment of the present invention. The adapter 10 may be operatively connected to a threaded nipple 29 on an engine 17. An O-ring 19 may be placed between the engine 17 and the adapter 10 to maintain a fluid-tight seal. Oil coming out from the engine 17 may pass through a first orifice 16 (shown on FIGS. 1-4) on the adapter 10. The oil may be transported to an oil cooler 23 by an inlet oil line 22a. The oil may circulate through the oil cooler 23 to cool the oil. The oil may be transported from the oil cooler 23 to a remote oil filter 15 by a hose 27. The oil may be transported from the remote oil filter 15 to a second orifice 14 (shown on FIGS. 1-4) on the adapter 10 by using an outlet oil line 22b.

Referring now to FIGS. 1-5, the adapter 10 may include a main body 11 including edges 13. The main body 11 may be a spin-on type body. The main body 11 may be a single piece body. The main body 11 may be made of a heat resistant material, for example, metal. The main body 11 may be made by metal casting, stamping, forging, molding, or machining. The size of the main body 11 may depend on the type of engine 17 and the capability of the remote oil filter 15.

A base 24 may be secured to the main body 11. The shape of the base 24 may depend on the shape of the main body 11. The shape of the base 24 may be, for example, round. A threaded circular groove 20 may be partially recessed in an outer surface 25 of the base 24. The circular groove 20 may be adapted to receive the O-ring 19 (shown on FIG. 12) to maintain a fluid-tight seal between the adapter 10 and the engine 17. A gap 37 may be formed on the inside of the base 24. The gap 37 may be formed underneath of the step 27. The gap 37 may provide the base 24 with additional space for the oil to move.

A step 27 may be formed between the main body 11 and the base 24 and framed between adjacent fins 12. The step 27 may include a perimeter 39 having a wavy pattern. The wavy pattern of the perimeter 39 may include peaks 39A and valleys 39B. The step 27 may provide the adapter 10 with additional surface area for the cooling process.

The first orifice 16 and the second orifice 14 may extend throughout the main body 11, the step 27, and the base 24. The first orifice 16 and the second orifice 14 may include internal threads 30, 28 respectively. The size of the first orifice 16 and the second orifice 14 may depend on the size of the inlet oil line 22*a* and the outlet oil line 22*b*.

A sleeve 18 may be connected to the first orifice 16. The sleeve 18 may include threads 32 to facilitate the connection with the threads 30 of the first orifice 16.

A plurality of cooling fins 12 may be integrated into the edges 13 of the main body 11. The cooling fins 12 may increase the surface area of the adapter 10 providing the remote oil filter 15 (shown on FIG. 12) with additional cooling capabilities. The cooling fins 12 may protrude radially from the edges 13 of the main body 11 and extend in a circular pattern from the edges 13 of the main body 11. The cooling fins 12 may be built into the main body 11 during the manufacturing process by stamping, molding, forging, casting or machining.

The base 24 may include a perimeter 31 having a wavy pattern. The wavy pattern of the perimeter 31 may include peaks 31B at distal ends of the fins 12 and valleys 31A in between the fins 12. The wavy pattern of the perimeter 31 may help create a larger surface area for the cooling fins 12 to rest on.

Referring now to FIGS. 6-8, the main body 11 may include an inner section 38. The sleeve 18 may be attached to the inner section 38 of the main body 11. The sleeve 18 may have a first end 18A adapted to be secured to the threaded nipple 29 (shown on FIG. 12) to secure the adapter 10 to the engine 17. A second end 18B of the sleeve 18 may be connected to the first orifice 16.

FIGS. 9-11 show an adapter 34 for a remote oil filter, for example, the remote oil filter 15 shown in FIG. 12, according to another exemplary embodiment of the present invention. In this embodiment, the adapter 34 may be the same as the embodiment shown in FIGS. 1-8 except that the adapter 34 may include a plurality of cooling fins 36 protruding circumferentially from a main body 26. The cooling fins 36 may be parallel to each other around the main body 26, planar from the base 24.

The adapter 10, 34 may add additional cooling capability to the oil filtering system by increasing the surface area, which in turn increases the heat dissipation through heat sink. The heat may be transferred from a solid material (the adapter 10, 34) to another medium, such as air. The hot engine oil may be in contact with the adapter 10, 34 as the engine 17 pumps the oil through it. Because of the larger surface area of the adapter 10, 34, greater heat transfer is achieved, and greater cooling capability may be obtained.

It should be understood, of course, that the foregoing relates to exemplary embodiments of the invention and that modifications may be made without departing from the spirit and scope of the invention as set forth in the following claims.

What is claimed is:

1. A spin-on adapter for a remote oil filter comprising:
a unitary piece main body including edges;
a base attached to the main body;
a step between the main body and the base;
a first orifice extending through the main body, the step, and the base;
a second orifice extending through the main body, the step, and the base; and
a plurality of cooling fins radially protruding from the edges of the main body, and extending vertically from a top surface of said base and a top surface of said step, wherein, the plurality of fins are integral with the unitary piece main body, and the adapter is capable of being secured to a vehicle engine.

2. The spin-on adapter according to claim 1, wherein the main body includes a threaded sleeve for securing the adapter to a vehicle engine.

3. A spin-on adapter for a remote oil filter comprising:
a main body including edges and defining a longitudinal axis;
a base attached to the main body;
a step formed between the main body and the base;
a first orifice extending through the main body, the step, and the base;
a second orifice extending through the main body, the step, and the base; and
a plurality of cooling fins extending axially along said longitudinal axis, integral with, and radially protruding from the edges of the main body, wherein the base and the step include a perimeter having a wavy shape including peaks and valleys, the fins extend away from the main body until reaching the peaks of the base.

4. The spin-on adapter according to claim 3, wherein the cooling fins extend in a circular pattern around the edges of the main body.

5. The spin-on adapter according to claim 3, further including a gap on the inside of the base, underneath of the step.

6. The spin-on adapter according to claim 3, wherein the main body includes a threaded sleeve for securing the adapter to the vehicle engine.

* * * * *